United States Patent
Zhang et al.

(10) Patent No.: US 10,496,616 B2
(45) Date of Patent: Dec. 3, 2019

(54) LOG FRAGMENTATION METHOD AND APPARATUS

(71) Applicant: Alibaba Group Holding Limited, Grand Cayman (KY)

(72) Inventors: Guangzhou Zhang, Hangzhou (CN); Xiaojian Fan, Hangzhou (CN); Wenjing Zeng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 336 days.

(21) Appl. No.: 15/382,293

(22) Filed: Dec. 16, 2016

(65) Prior Publication Data

US 2017/0177628 A1 Jun. 22, 2017

(30) Foreign Application Priority Data

Dec. 17, 2015 (CN) .......................... 2015 1 0954804

(51) Int. Cl.
  *G06F 16/215* (2019.01)
  *G06F 16/22* (2019.01)
  *G06F 16/23* (2019.01)
  *G06F 16/27* (2019.01)

(52) U.S. Cl.
  CPC ........ *G06F 16/215* (2019.01); *G06F 16/2246* (2019.01); *G06F 16/2358* (2019.01); *G06F 16/27* (2019.01); *G06F 16/273* (2019.01)

(58) Field of Classification Search
  CPC combination set(s) only.
  See application file for complete search history.

(56) References Cited

U.S. PATENT DOCUMENTS

| | | |
|---|---|---|
| 4,794,528 A | 12/1988 | Hirose et al. |
| 9,183,200 B1 | 11/2015 | Liu et al. |
| 2003/0225760 A1 | 12/2003 | Ruuth et al. |
| 2006/0200501 A1 | 9/2006 | Holenstein et al. |
| 2007/0260793 A1 | 11/2007 | Chou et al. |
| 2010/0030752 A1* | 2/2010 | Goldentouch .......... G06F 16/81 707/797 |
| 2012/0030477 A1 | 2/2012 | Lu et al. |

(Continued)

FOREIGN PATENT DOCUMENTS

| | | |
|---|---|---|
| CN | 101902441 A | 12/2010 |
| CN | 102792297 A | 11/2012 |

(Continued)

OTHER PUBLICATIONS

Markus Winand et al. (SQL Performance Explained Eight Edition, Sep. 1-3, 2011) from Http://SQL-Performance-Explained.com.*

(Continued)

*Primary Examiner* — Shyue Jiunn Hwa
(74) *Attorney, Agent, or Firm* — Lee & Hayes, P.C.

(57) ABSTRACT

A log fragmentation method is disclosed. A slave database server receives a first log sent by a master database server, wherein the first log includes a data table identifier and match identifier. The slave database server determines a match tree based on the data table identifier of the first log, and fragments the first log based on the match tree. Using a match tree that has been set up, a tree structure of the match tree can be effectively utilized to fragment a log, and the fragmented log has a high degree of concurrency, thus improving the efficiency of log replay.

20 Claims, 4 Drawing Sheets

(56) References Cited

U.S. PATENT DOCUMENTS

| | | | |
|---|---|---|---|
| 2013/0198838 A1 | 8/2013 | Schmidt et al. | |
| 2014/0122429 A1 | 5/2014 | Chen et al. | |
| 2014/0279920 A1 | 9/2014 | Madhavarapu et al. | |
| 2015/0134926 A1* | 5/2015 | Yang | G06F 3/0611 711/167 |
| 2016/0292107 A1 | 10/2016 | Kim | |
| 2016/0345361 A1 | 11/2016 | Linzmaier | |

FOREIGN PATENT DOCUMENTS

| | | |
|---|---|---|
| CN | 102945249 A | 2/2013 |
| CN | 103207882 A | 7/2013 |
| CN | 103297485 A | 9/2013 |
| CN | 104765748 A | 7/2015 |
| CN | 105162626 A | 12/2015 |

OTHER PUBLICATIONS

SQL Performance Explained Eight Edition, Sep. 1-3, 2011 from Http://SQL-Performance-Explained.com.*

PCT Search Report and Written Opinion dated Mar. 27, 2017 for PCT Application No. PCT/US16/67351, 9 pages.

Extended European Search Report dated May 10, 2019 for European Patent Application No. 16876851.3, 7 pages.

First Chinese Office Action dated Oct. 9, 2019 for Chinese patent application No. 201510954804.X, a foreign application of U.S. Appl. No. 15/382,293, 5 pages.

Chinese Search Report dated Sep. 19 2019 for PCT application No. 201510954804.X, 2 pages.

* cited by examiner

LOG FRAGMENTATION METHOD AND APPARATUS

CROSS REFERENCE TO RELATED PATENT APPLICATION

This application claims foreign priority to Chinese Patent Application No. 201510954804.X filed on Dec. 17, 2015, entitled "Log Fragmentation Method and Apparatus", which is hereby incorporated by reference in its entirety.

TECHNICAL FIELD

The present disclosure relates to the field of data processing, and in particular, to log fragmentation methods and apparatuses.

BACKGROUND

A database generally employs a master/slave architecture mode, which includes a master database server and a slave database server. The master database server is used for providing external services, and the slave database server serves as a backup for the master database server. When the master database server goes down, the slave database server can continue to provide services originally provided by the master database server, thereby improving the usability of the database.

When using a database, a user may perform an operation on data in the database, which may lead to changes in the data. Data changes may include operations that may change the data, such as a deletion, an addition, and replacement of the data. In order to record these data changes, the master database server may generate a corresponding data log for a data change, to record a data object that is changed and changed content of this data change. In order to continue to provide users with services that are originally provided by the master database server when the master database server goes down, the slave database server needs to receive data logs recorded by the master database server from the master database server, and conduct log replay using these data logs, to implement synchronization between database data in the slave database server and database data in the master database server.

When a relatively large number of user connections exist in the master database server, the master database server may generate a large amount of data logs. If a log replay speed of the slave database server is excessively low, the data logs received by the slave database server cannot be replayed in time, causing the data logs to pile up at the slave database server. At this point, if the master database server goes down, the slave database server cannot replace the master database server immediately. Only after the slave database server finishes the log replay of the piled data logs can the slave database server start to provide services to users, thus affecting user experience.

In order to finish log replay of the data logs received from the master database server in time, the slave database server needs to carry out log replay on the data logs concurrently, to improve the efficiency of log replay. In order to implement concurrent log replay on the data logs, the slave database server needs to fragment the received data logs to obtain multiple fragments. The slave database server may simultaneously replay multiple fragments, so that a concurrent log replay function is implemented on the slave database server.

Currently, how to efficiently fragment a log is an urgent problem to be solved.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

To solve the aforementioned technical problem, the present disclosure provides a method and an apparatus for log fragmentation to enable a relatively balanced number of data logs in fragments after log fragmentation, thus improving the efficiency of log replay of a slave database server.

Embodiments of the present disclosure disclose the following technical solutions.

In implementations, a log fragmentation method may include receiving a first log that is sent from a master database server by a slave database server, the first log including a data table identifier and a match identifier corresponding thereto; determining a match tree by the slave database server based on the data table identifier of the first log; and fragmenting the first log by the slave database server according to the match tree.

In implementations, the method may further include obtaining the match tree according to a target table set, the target table set including at least one data table in a database, and a tree structure of the match tree including a root node and at least one layer of sub-nodes of the root node. A range of match values for matching the root node is determined based on ranges of match identifiers that are included in multiple target logs. The multiple target logs include data logs corresponding to the at least one data table, and the first log is a target log of the multiple target logs. Furthermore, a total range of sub-match values for matching of all sub-nodes at a layer is the same as the range of match values for the root node. By setting a range of sub-match values of sub-nodes at the bottom layer of the tree structure of the match tree, a difference between data of target logs that are distributed to the sub-nodes at the bottom layer by matching is less than a preset difference in a log fragmentation via the match tree. A sub-node at the bottom layer of the tree structure of the match tree corresponds to a fragment.

In implementations, fragmenting the first log by the slave database server according to the match tree may include matching the match identifier of the first log with the match tree by the slave database server, and determining a target sub-node that matches the match identifier of the first log according to the tree structure of the match tree, the match identifier of the first log being located in a range of sub-match values of the target sub-node, and the target sub-node being a sub-node at the bottom layer of the tree structure; and distributing the first log to a fragment corresponding to the target sub-node by the slave database server.

In implementations, the match identifier of the first log may be used for identifying a first data record, and the first data record is a data record in a data table corresponding to the first log.

In implementations, the match identifier of the first log may be a primary key value of the first data record.

In implementations, the match tree may include a partial tree structure of a balanced tree that describes a data table in the at least one data table. Correspondingly, the root node of the match tree is a root node of the balanced tree, and the at least one layer of sub-nodes is at least one layer of branch nodes of the balanced tree.

In implementations, during the log fragmentation, a number of layers of branch nodes of the balanced tree included in the match tree is increased if target logs distributed to a fragment exceed a preset threshold, thus increasing the number of fragments obtained through the log fragmentation.

In implementations, the first log further includes a log identifier and a data change in a data table corresponding to the first log. In implementations, the method further may include concurrently replaying, by the slave database server, multiple fragments obtained through the log fragmentation, where the slave database server replays the first log according to the log identifier of the first log and the data change.

In implementations, a log fragmentation apparatus may include a receiving unit to receive a first log that is sent from a master database server by a slave database server, the first log including a data table identifier and a match identifier corresponding thereto; a determination unit to determine a match tree based on the data table identifier of the first log; and a fragmentation unit to segment the first log based on the match tree.

In implementations, the apparatus may further include a match tree setting unit to obtain the match tree according to a target table set, the target table set including at least one data table in a database, and a tree structure of the match tree including a root node and at least one layer of sub-nodes of the root node. A range of match values for matching the root node is determined based on ranges of match identifiers that are included in multiple target logs. The multiple target logs include data logs corresponding to the at least one data table, and the first log is a target log of the multiple target logs. Furthermore, a total range of sub-match values for matching of all sub-nodes at a layer is the same as the range of match values for the root node. By setting a range of sub-match values of sub-nodes at the bottom layer of the tree structure of the match tree, a difference between data of target logs that are distributed to the sub-nodes at the bottom layer by matching is less than a preset difference in a log fragmentation via the match tree. A sub-node at the bottom layer of the tree structure of the match tree corresponds to a fragment.

In implementations, the fragmentation unit may match the match identifier of the first log with the match tree, and determine a target sub-node that matches the match identifier of the first log according to the tree structure of the match tree, the match identifier of the first log being located in a range of sub-match values of the target sub-node, and the target sub-node being a sub-node at the bottom layer of the tree structure, and distribute the first log to a fragment corresponding to the target sub-node.

In implementations, the match identifier of the first log may be used for identifying a first data record, and the first data record is a data record in a data table corresponding to the first log.

In implementations, the match identifier of the first log may be a primary key value of the first data record.

In implementations, the match tree may include a partial tree structure of a balanced tree that describes a data table in the at least one data table. Correspondingly, the root node of the match tree is a root node of the balanced tree, and the at least one layer of sub-nodes is at least one layer of branch nodes of the balanced tree.

In implementations, during the log fragmentation, a number of layers of branch nodes of the balanced tree included in the match tree is increased if target logs distributed to a fragment exceed a preset threshold, thus increasing the number of fragments obtained through the log fragmentation.

In implementations, the first log may further include a log identifier and a data change in a data table corresponding to the first log. In implementations, the apparatus may further include a replay unit configured to concurrently replay multiple fragments obtained through the log fragmentation, where a slave database server replays the first log according to the log identifier of the first log and the data change.

As can be seen from the above technical solutions, a slave database server receives a first log sent from a master database server, determines a match tree according to a data table identifier of the first log, and fragments the first log according to the match tree. Through the match tree that is set, the log can be effectively fragmented using a tree structure of the match tree, and the fragmented log has a high degree of concurrency, thus improving the efficiency of log replay.

BRIEF DESCRIPTION OF THE DRAWINGS

In order to describe exemplary embodiments of the present disclosure or technical solutions to existing technologies more clearly, drawings to be used for describing the embodiments are briefly described herein. Apparently, the described drawings merely represent a few embodiments of the present disclosure. One of ordinary skill in the art can obtain other drawings based on these drawings without making any creative effort.

DETAILED DESCRIPTION

In order to make the objectives, technical solutions, and advantages of the embodiments of the present disclosure more clearly, the technical solutions of the present disclosure are described herein with reference to the accompanying drawings of the embodiments of the present disclosure clearly. Apparently, the described embodiments merely represent a part of and not all of available embodiments of the present disclosure. Based on these embodiments of the present disclosure, all other embodiments derived by one of ordinary skill in the art without making any creative effort shall fall in the scope of protection of the present disclosure.

Figure 1:
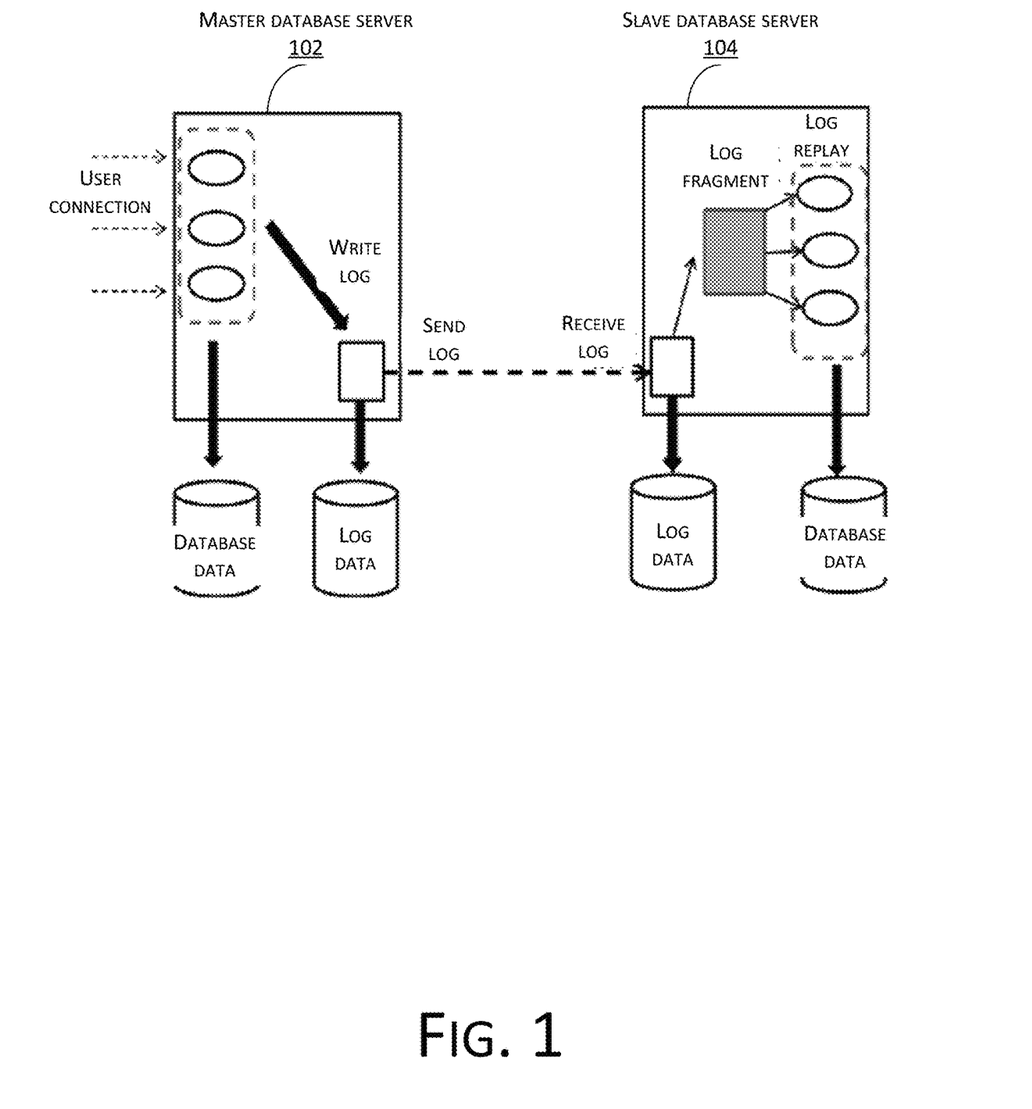
FIG. 1 is a schematic architectural diagram of a database.

A database generally employs a master/slave architecture mode, which includes a master database server and a slave database server. FIG. 1 shows a schematic architectural diagram of a database. FIG. 1 shows a master database server 102 on the left hand side, and a slave database server 104 on the right hand side. The master database server 102 is used for providing external services, and the slave database server 104 serves as a backup for the master database server 102. When the master database server 102 goes down, the slave database server 104 can continue to provide services originally provided by the master database server 102, thereby improving the usability of the database.

In order to enable the slave database server 104 to continue to provide users with services originally provided by the master database server 102 quickly after the master database server 102 goes down, data synchronization needs to be maintained between the master database server 102 and slave database server 104 in real time. As shown in FIG. 1, the slave database server receives a data log sent by the master database server, and implements data synchronization with the master database server through log replay. If the database server on the left hand side of FIG. 1 is a server a, and the database server on the right hand side of FIG. 1 is a server b, It should be noted that the server b changes from the role of a slave database server to a master database server when the server b replaces the server a to continue to provide services to users. Subsequently, a corresponding slave database server may be configured for the server b, and the server b can perform operations as those performed by the original master database server, and send a generated data log to the slave database server of the server b. The slave database server of the server b may be the server a having working capabilities been recovered, or may be another database server, which is not limited herein.

In order to perform log replay rapidly and effectively, the slave database server needs to fragment the received data log first, and then replay multiple fragments obtained from the log fragmentation in parallel.

For this purpose, the embodiments of the present disclosure provide a method and an apparatus for log fragmentation. A slave database server receives a first log sent by a master database server, and determines a match tree based on a data table identifier of the first log, and fragments the first log according to the match tree. A tree structure of the match tree can be effectively utilized to fragment the log using the match tree that has been configured, and the fragmented log has a high degree of concurrency, thus improving the efficiency of log replay.

Currently, a conventional log fragmentation method is mainly a log fragmentation method used in an official version of MySQL (which is a relational database management system), in which data logs are fragmented at a granularity of database. When data is concentrated in one database or a few number of databases, this may result in most data logs being generated for these databases. Therefore, when a slave database server fragments logs using this conventional fragmentation method, this may result in data logs being concentrated in a few fragments, and thus a significant difference exists in respective numbers of data logs distributed to each fragment. For example, too many data logs are distributed to fragments of these few databases, and too few data logs are distributed to other fragments. As such, when the slave database server performs concurrent log replay, the degree of concurrency is excessively low and thus the efficiency of log replay is not improved a lot. In other words, a desirable fragmentation effect at present is how to fragment data logs in a balanced manner such that numbers of data logs distributed to fragments do not differ significantly.

In view of this problem of unbalanced fragmentation, a match tree corresponding to data tables in a target table set is configured and the match tree is used as a basis for fragmenting a target log according to the embodiments of the present disclosure. When configuring the match tree, ranges of sub-match values of sub-nodes at the bottom layer of a tree structure of the match tree are configured, such that a difference between data of target logs distributed to the sub-nodes at the bottom layer through matching during log fragmentation via the match tree is less than a preset difference. In an exemplary fragmentation process, a slave database server may determine a corresponding match tree for a received first log based on a data table identifier of a first log, match a match identifier of the first log with sub-match values of sub-nodes in the match tree to obtain a target sub-node, and dispatch the first log to a fragment corresponding to the target sub-node. Since the preset difference is generally set as a relatively small value, and thus respective amount of target logs included in fragments that are obtained do not differ significantly, and are relatively balanced. In this case, when the slave database server performs concurrent log replay, the degree of concurrency is high and the efficiency of the log replay is improved.

The log fragmentation method provided in the embodiments of the present disclosure may use a preset match tree. By properly setting sub-match values of sub-nodes at the last layer of a tree structure of the match tree, respective numbers of data logs matched to the sub-nodes at this layer do not differ significantly, thus maintaining data logs in fragments in a balanced manner.

A database stores data mainly in a form of a table. In implementations, a data table may be considered as a table in a database.

In implementations, a match tree may be obtained according to a table set. For example, a match tree may be correlated to an identifier of a data table in a table set. The slave database server may invoke a match tree corresponding to a data table identifier based on the data table identifier included in a data log, and use the match tree to fragment the data log. In other words, match trees invoked by the slave database server for log fragmentation may be different for data tables in different table sets. If a table set includes multiple data tables, the slave database server may invoke a same match tree as a basis for log fragmentation for these data tables. Given a match tree obtained for a target table set, a tree structure of that match tree may include a root node and at least one layer of sub-nodes of the root node. A range of match values for matching of the root node is determined based on ranges of match identifiers included in multiple target logs. These multiple target logs are data logs corresponding to at least one data table. It should be noted that the first log to be described hereinafter is a target log of these multiple target logs.

A total range of sub-match values for matching of all sub-nodes at a same layer is the same as the range of match values for the root node. Ranges of sub-match values of sub-nodes at the bottom layer of the tree structure of the match tree are set such that a difference between data of target logs distributed to the sub-nodes at the bottom layer by matching during log fragmentation via the match tree is less than a preset difference. A sub-node at the bottom layer corresponds to a fragment.

For example, the range of match values of the root node may generally cover match identifiers of all target logs. In other words, a value type of the match values is correlated to a value type of the match identifiers. For the same target table set, if match identifiers included in target logs are set to have an identifier type a, a value type of a match value of the root node is correlated to a value type of the identifier type a. If the match identifiers included in the target logs have an identifier type b, the value type of the match value of the root node is correlated to a value type of the identifier type b. Correspondingly, a value type of a sub-match value of a sub-node is the same as the value type of the match value of the root node. Moreover, respective ranges of sub-match values for matching sub-nodes at each layer do not overlap with each other. In this way, a situation in which a match identifier of a target log can match two sub-nodes after matching does not occur.

In implementations, at least two approaches of setting respective ranges of sub-match values of sub-nodes at the bottom layer of a tree structure of a match tree are provided herein.

The first approach constructs a match tree autonomously by means of an empirical value. In this approach, the autonomously constructed match tree may have only one layer of sub-nodes configured under a root node, and this layer of sub-nodes is the bottom layer of sub-nodes. A range of sub-match values of each sub-node may be adjusted dynamically according to a log distribution result of the slave database server, to fulfill a criterion that a difference between respective numbers of target logs in different fragments is less than a preset difference. In implementations, a dynamic adjustment may include correspondingly decreasing a range of sub-match values of a sub-node corresponding to a fragment in response to a number of target logs distributed to this fragment being apparently greater than number(s) of target logs in other fragment(s) to lower the rate of allocating target logs to this fragment. When a number of target logs distributed to a fragment is apparently less than number(s) of target logs in other fragment(s), a range of sub-match values of a sub-node corresponding to this fragment may be correspondingly increased, to increase the rate of distributing target logs to this fragment.

The second approach may employ an existing tree structure as a match tree. The match tree may include a partial tree structure of a balanced tree that describes a data table in at least one data table. Correspondingly, a root node of the match tree is a root node of the balanced tree, and the at least one layer of sub-nodes is at least one layer of branch nodes of the balanced tree.

Figure 2:
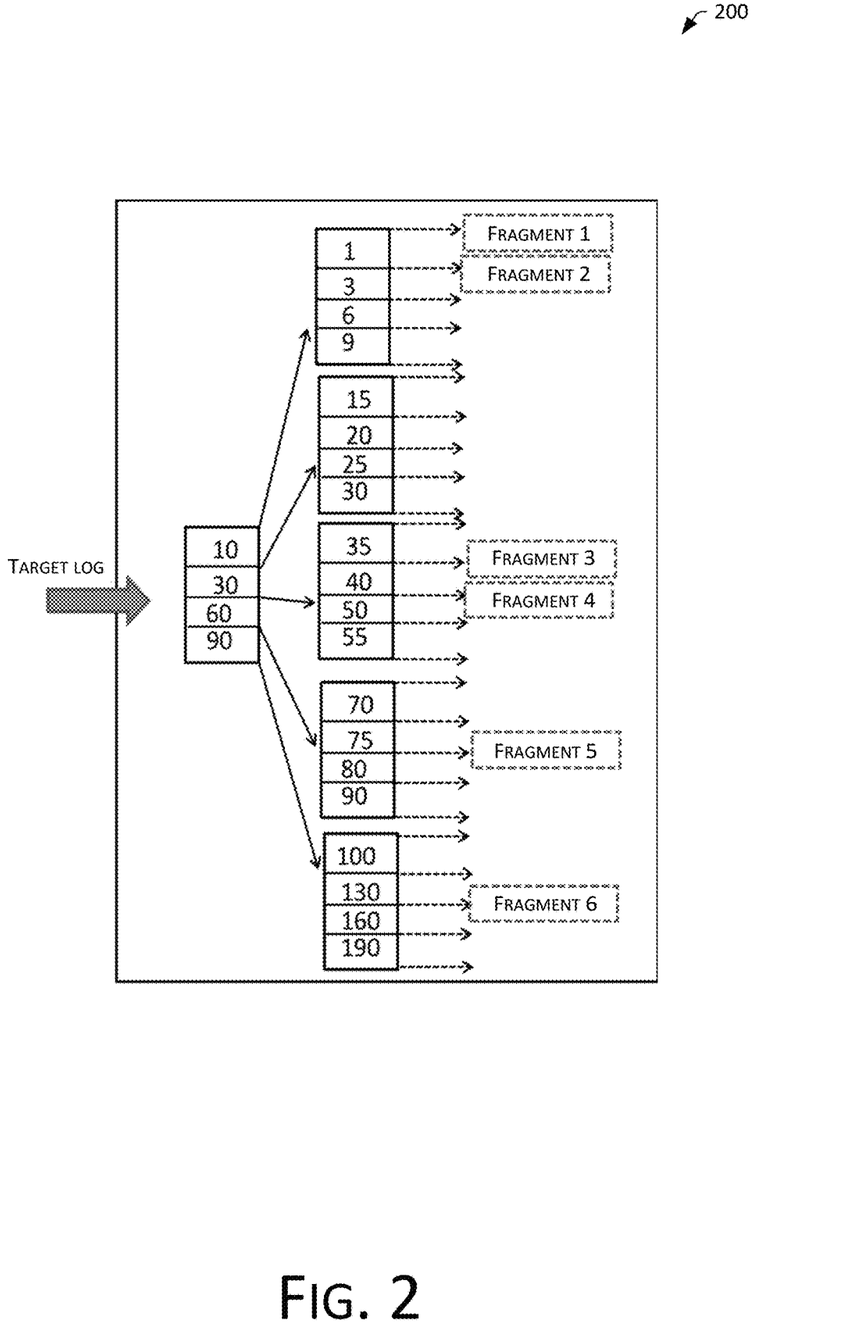
FIG. 2 is a schematic use diagram of a match tree according to an embodiment of the present disclosure.

The tree structure of the balanced tree described herein may be a specific structure type of a B tree (balanced tree), a B+ tree, or other B tree. Due to structural characteristics of the balanced tree, there is a high likelihood that numbers of target logs in fragments that are obtained after fragmenting target logs of a data table via the match tree are in a relatively balanced condition. In implementations, only a root node and a portion of directly connected branch nodes of a balanced tree may be used as a match tree. FIG. 2 shows a schematic use diagram of a match tree 200 according to an embodiment of the present disclosure. As shown in FIG. 2, a match tree 200 includes a partial tree structure of a balanced tree for describing a data table in at least one data table. The first layer of the tree structure of the match tree is a root node, and a range of match values of the root node covers 1 to 190 (this value range is determined based on match identifiers). In implementations, the range may be divided into four sections: a first section covers 1 to 10, a second section covers 11 to 30, a third section covers 31 to 60, and a fourth section covers 91 to 190. Different sections correspond to various portions of sub-nodes (branch nodes of the balanced tree) at the second layer, i.e., the last layer, in the tree structure. The second layer includes 20 sub-nodes, and a range of sub-match values of each sub-node is determined based on the balanced tree. For example, in FIG. 2, a range of sub-match values of a sub-node at the top is 1 to 2, a range of sub-match values of a second sub-node is 3 to 5, etc.

In implementations, when the slave database server fragments logs according to the second approach, the speed of concurrent log replay of the slave database server may be considered to be lower than the speed of distributing target logs to each fragment, if too many target logs in each fragment exist during log fragmentation. The speed of distributing target logs to each fragment may be correspondingly lowered by increasing the number of fragments. In a balanced tree, a larger number of layers indicates a relatively larger number of branch nodes. Accordingly, in implementations, if a number of target logs distributed to a fragment exceeds a preset threshold during log fragmentation, a number of layers of branch nodes of the balanced tree included in the match tree is increased, thus increasing the number of fragments obtained through the log fragmentation.

If a target table set includes only one data table (i.e., a balanced tree forming a match tree is used for describing this data table) when the match tree is set up using the second approach, an optimal fragmentation effect can be achieved during log fragmentation performed by the slave database server. In other words, the numbers of target logs in fragments can be balanced to the most extent.

An example is used herein to describe how a slave database server fragments a target log via a set match tree.

Figure 3:
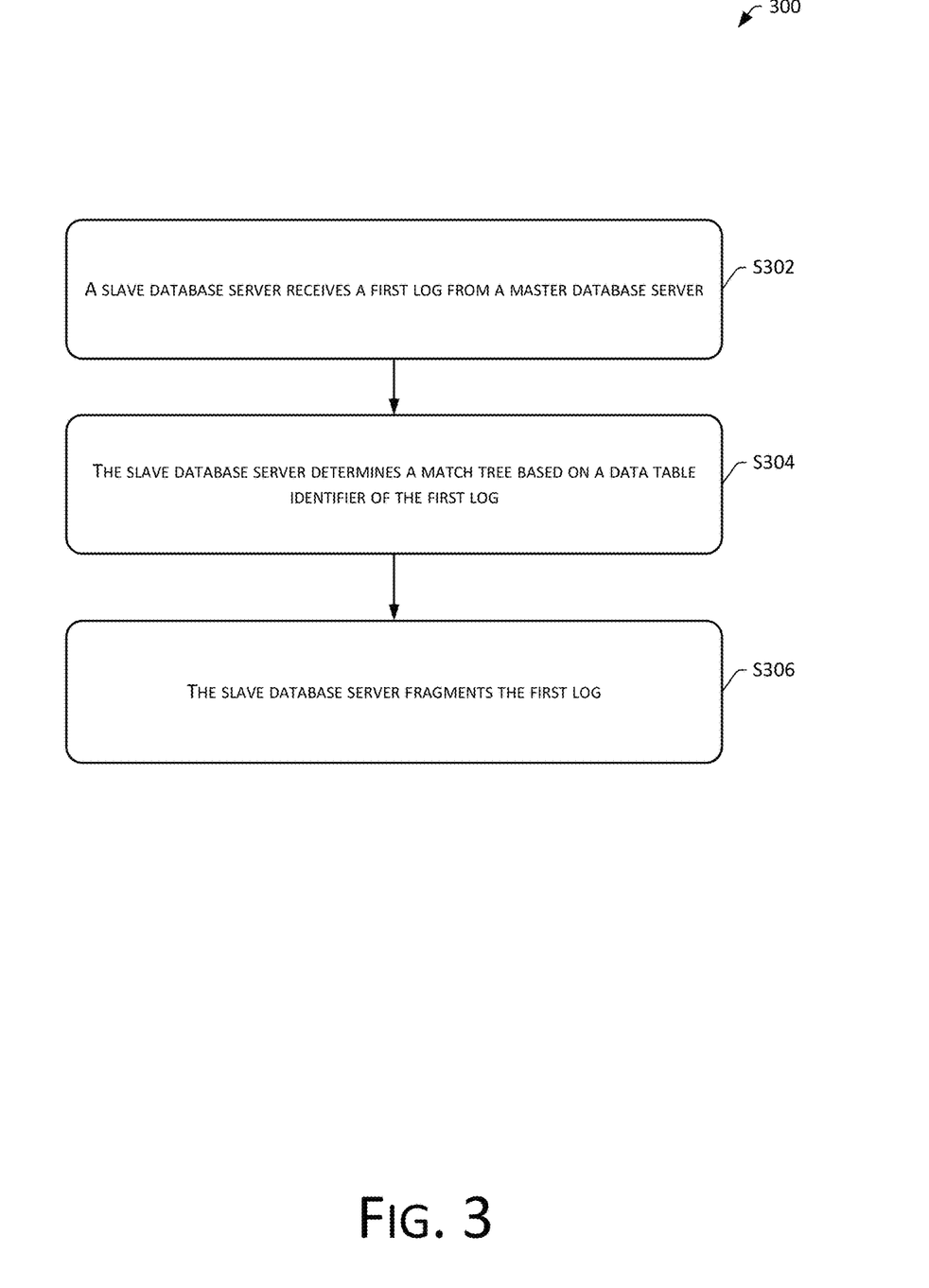
FIG. 3 is a flowchart of a log fragmentation method according to an embodiment of the present disclosure.

FIG. 3 shows a flowchart of a log fragmentation method 300 according to an embodiment of the present disclosure. In implementations, the method may include the following operations.

At S302, a slave database server receives a first log sent by a master database server, the first log including a data table identifier and a match identifier corresponding thereto.

For example, since a data log is generated for recording a change made by a user to a data table, the data log needs to include at least a corresponding data table identifier. To enable the slave database server to complete fragmentation of the log, the data log also needs to include a corresponding match identifier.

In order to facilitate log replay, it is desirable that all target logs distributed to a fragment correspond to a same data table. In order to achieve this effect, in implementations, a match identifier included in a target log is used for identifying a data table corresponding to that target log.

In a conventional log fragmentation approach, target logs with adjacent primary key values may be distributed to different fragments during fragmentation. For example, data logs corresponding to primary keys having primary key values as 1000 and 10001 are distributed to different fragments and processed in parallel, while data records corresponding thereto may be located in the same data page. During log replay, situations such as lock conflicts and waiting may occur. In order to solve this type of situation, in implementations, the match identifier of the first log is used for identifying a first data record, and the first data record is a data record in a data table corresponding to the first log.

Furthermore, in implementations, the match identifier of the first log may be a primary key value of the first data record. In this way, data logs corresponding to adjacent primary keys after the log fragmentation may be distributed to the same fragment as much as possible, and a subsequent log replay can be performed by a single process, thus reducing lock conflicts and repeated page locking and unlocking during the log replay.

At S304, the slave database server determines a match tree based on the data table identifier of the first log.

In other words, the slave database server may invoke different match trees for log fragmentation according to different data table identifiers.

At S306, the slave database server fragments the first log based on the match tree.

As can be seen, the slave database server receives a first log sent by the master database server, determines a match tree according to a data table identifier of the first log, and fragments the first log according to the match tree. Through the match tree that has been set, a tree structure of the match tree can be effectively utilized to fragment the log, and the fragmented log has a high degree of concurrency, thus improving the efficiency of log replay.

In implementations, the present disclosure further provides an exemplary approach for log fragmentation of the first log. Specifically, the slave database server may fragment the first log based on the match tree by matching the match identifier of the first log with the match tree, determining a target sub-node that matches the match identifier of the first log according to a tree structure of the match tree (with the match identifier of the first log being within a range of sub-match values of the target sub-node, and the target sub-node being a sub-node at the bottom layer of the tree structure), and distributing the first log to a fragment corresponding to the target sub-node.

For example, a corresponding data log generated according to an update operation is used as an example. A process of fragmenting the data log by the slave database server may include the following operations. If a table corresponding to this operation is T1 and a match identifier is a primary key value, a tree structure of a match tree that is used for fragmenting the table T1 may be a structure as shown in FIG. 2. If a primary key value of a primary key of a data record modified by the update operation is 78, the slave database server may perform matching using the match tree as shown in FIG. 2 based on the primary key value (which is used as the match identifier), after receiving this data log. According to an indexed matching procedure, a key value of a root node is first matched to positions between key values of 60 to 90. Matching continues at the next layer of sub-nodes. In the next layer of sub-nodes, sub-nodes which sub-match values range from 75 to 80 are obtained by matching, while all data logs falling in this sub-match value range by matching are allocated to a fragment 5. For other data logs in the table T1, the slave database server may also perform similar matching and fragmentation using the match tree as shown in FIG. 2 based on respective primary key values that the data logs include as match identifiers.

As can be seen, a match tree corresponding to data tables in a target table set is set, and the match tree is used as a basis for fragmenting a target log. When setting up the match tree, a range of sub-match values of sub-nodes at the bottom layer of a tree structure of the match tree is set such that a difference between data of target logs distributed to the sub-nodes at the bottom layer by matching during log fragmentation via the match tree is less than a preset difference. In an exemplary fragmentation process, the slave database server determines a corresponding match tree for a received first log according to a data table identifier of the first log, performs matching of a match identifier of the first log with sub-match values of sub-nodes in the match tree to obtain a target sub-node, and distributes the first log to a fragment corresponding to the target sub-node. Since the preset difference is generally set as a small value, obtained numbers of target logs included in fragments do not differ significantly, and are in a relatively balanced condition. In this case, when the slave database server replays logs in parallel, the degree of concurrency is high and the efficiency of the log replay is improved.

Furthermore, during fragmentation, the slave database server may also simultaneously replay the target logs in the fragments in parallel. As such, the first log may further include a log identifier and a data change to a data table corresponding to the first log. In implementations, the method may further include concurrently replaying multiple fragments obtained through the log fragmentation by the slave database server, where the slave database server replays the first log based on the log identifier of the first log and the data change, thereby implementing data synchronization with the master database server.

Figure 4:
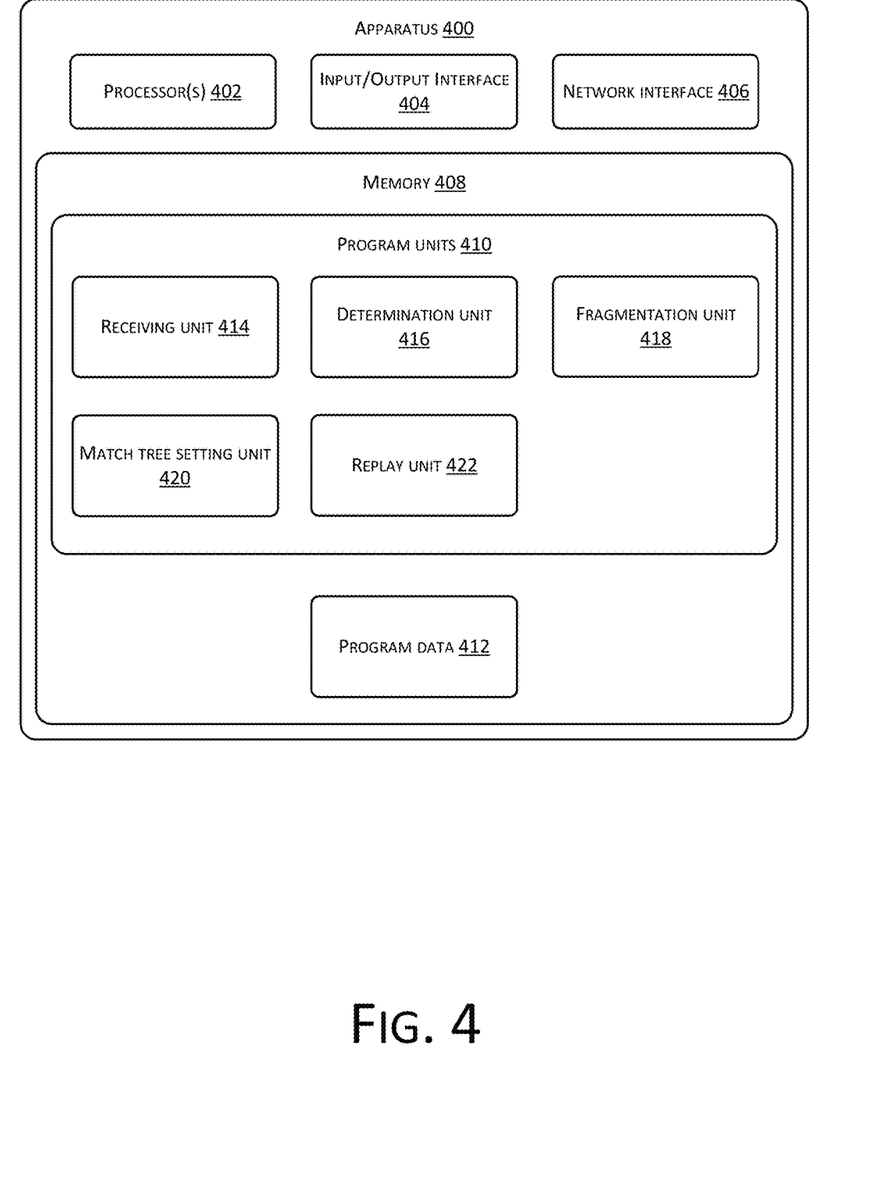
FIG. 4 is a structural diagram of a log fragmentation apparatus according to an embodiment of the present disclosure.

FIG. 4 is a structural diagram of a log fragmentation apparatus 400 according to an embodiment of the present disclosure. In implementations, the apparatus 400 may include one or more computing devices distributed and/or connected via a network. In implementations, the apparatus 400 may be the slave database server described in the foregoing description. By way of example and not limitation, the apparatus 400 may include one or more processors 402, an input/output (I/O) interface 404, a network interface 406, and memory 408.

The memory 408 may include a form of computer-readable media, e.g., a non-permanent storage device, random-access memory (RAM) and/or a nonvolatile internal storage, such as read-only memory (ROM) or flash RAM. The memory 408 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 408 may include program modules 410 and program data 412. The program units 410 may include a receiving unit 414, a determination unit 416 a fragmentation unit 418, and a match tree setting unit 420. The receiving unit 414 may receive a first log sent by a master database server, the first log including a data table identifier and a match identifier corresponding thereto.

In order to facilitate log replay, it is desirable that all target logs distributed to a fragment correspond to a same data table. In order to achieve this effect, in implementations, a match identifier included in a target log is used for identifying a data table corresponding to that target log.

In a conventional log fragmentation approach, target logs with adjacent primary key values may be distributed to different fragments during fragmentation. For example, data logs corresponding to primary keys having primary key values as 1000 and 10001 are distributed to different fragments and processed in parallel, while data records corresponding thereto may be located in the same data page. During log replay, situations such as lock conflicts and waiting may occur. In order to solve this type of situation, in implementations, the match identifier of the first log is used for identifying a first data record, and the first data record is a data record in a data table corresponding to the first log.

Furthermore, in implementations, the match identifier of the first log may be a primary key value of the first data record. In this way, data logs corresponding to adjacent primary keys after the log fragmentation may be distributed to the same fragment as much as possible, and a subsequent log replay can be performed by a single process, thus reducing lock conflicts and repeated page locking and unlocking during the log replay.

In implementations, the determination unit 416 may determine a match tree according to the data table identifier of the first log. The fragmentation unit 418 may fragment the first log according to the match tree.

As can be seen, a slave database server receives a first log sent by a master database server, determines a match tree according to a data table identifier of the first log, and fragments the first log according to the match tree. Through the match tree that has been set, a tree structure of the match tree can be effectively utilized to fragment the log, and the fragmented log has a high degree of concurrency, thus improving the efficiency of log replay.

In implementations, the fragmentation unit 418 may further match the match identifier of the first log with the match tree, and determine a target sub-node that matches the match identifier of the first log based on a tree structure of the match tree, and distribute the first log to a fragment corresponding to the target sub-node, the match identifier of the first log being within a range of sub-match values of the target sub-node, and the target sub-node being a sub-node at the bottom layer of the tree structure.

In implementations, the match tree setting unit 420 may obtain the match tree according to a target table set, the target table set including at least one data table in a database, and a tree structure of the match tree including a root node and at least one layer of sub-nodes of the root node. In implementations, a range of match values for matching the root node may be determined based on a range of match identifiers included in multiple target logs. The multiple target logs are data logs corresponding to the at least one data table, and the first log is a target log of the multiple target logs. In implementations, a total range of sub-match values for matching all sub-nodes at the same layer is the same as the range of match values of the root node. Respective ranges of sub-match values of sub-nodes at the bottom layer of the tree structure of the match tree are set such that a difference between data of target logs distributed to the sub-nodes at the bottom layer by matching during the log fragmentation via the match tree is less than a preset difference, and a sub-node at the bottom layer of the tree structure of the match tree corresponds to a fragment.

In implementations, the match tree may include a partial tree structure of a balanced tree that describes a data table in the at least one data table. Correspondingly, the root node of the match tree is a root node of the balanced tree, and the at least one layer of sub-nodes corresponds to at least one layer of branch nodes of the balanced tree.

In implementations, if target logs distributed to a fragment exceed a preset threshold during log fragmentation, a number of layers of branch nodes of the balanced tree included in the match tree is increased, thus increasing the number of fragments obtained through the log fragmentation.

As can be seen, a match tree corresponding to data tables in a target table set is set, and the match tree is used as a basis for fragmenting a target log. When setting up the match tree, a range of sub-match values of sub-nodes at the bottom layer of a tree structure of the match tree is set such that a difference between data of target logs distributed to the sub-nodes at the bottom layer by matching during log fragmentation via the match tree is less than a preset difference. In an exemplary fragmentation process, the slave database server determines a corresponding match tree for a received first log according to a data table identifier of the first log, performs matching of a match identifier of the first log with sub-match values of sub-nodes in the match tree to obtain a target sub-node, and distributes the first log to a fragment corresponding to the target sub-node. Since the preset difference is generally set as a small value, obtained numbers of target logs included in fragments do not differ significantly, and are in a relatively balanced condition. In this case, when the slave database server replays logs in parallel, the degree of concurrency is high and the efficiency of the log replay is improved.

Furthermore, the slave database server may also simultaneously replay target logs in fragments in parallel during fragmentation. As such, the first log may further include a log identifier and a data change to a data table corresponding to the first log. In implementations, the apparatus 400 may further include a replay unit 422 to replay multiple fragments obtained through the log fragmentation in parallel, wherein the slave database server replays the first log according to the log identifier of the first log and the data change.

One of ordinary skill in the art can understand that all or some of the operations of the aforementioned method embodiments may be implemented in relevant hardware instructed by a program. The program may be stored in a computer readable storage media. When executing the program, operations of the above method embodiments are performed.

It should be noted that the embodiments in the disclosure are described in a progressive manner. For identical or similar parts between the embodiments, reference may be made to each other. Description of each embodiment focuses on aspects different from those of other embodiments. In particular, the apparatus and system embodiments are described briefly herein because of their similarities to the method embodiments, and related parts thereof may be referenced to the description of the method embodiments. The apparatus and system embodiments described above are merely illustrative. Units described as individual components therein may or may not be physically separate from each other. Furthermore, components displayed as units may or may not be physical units, i.e., may be located at a single location or may be distributed among multiple network units. Some or all of the modules may be selected according to actual needs to implement the objectives of the solutions in the embodiments. One of ordinary skill in the art can understand and implement the embodiments without making any creative effort.

The foregoing description is merely exemplary implementations of the present disclosure, and the scope of protection of the present disclosure is not limited thereto. Any modifications or replacements that are readily developed by one skilled in the art based on the technical scope disclosed by the present disclosure should fall within the scope of protection of the present disclosure. Therefore, the scope of protection of the present disclosure shall be subject to the claims.

What is claimed is:

1. A method implemented by a slave database server, the method comprising:

receiving a first log sent by a master database server, the first log including a data table identifier, a match identifier, a log identifier, and a data change to a data table corresponding to the first log;

determining a match tree based at least in part on the data table identifier of the first log;

fragmenting the first log based at least in part on the match tree; and while fragmenting:
concurrently replaying multiple fragments obtained through a log fragmentation, wherein the first log is replayed according to the log identifier of the first log and the data change,
increasing a number of layers of branch nodes included in the match tree if a number of target logs distributed to the fragment exceeds a preset threshold,
matching the match identifier of the first log with the match tree, and
determining a target sub-node that matches the match identifier of the first log based at least in part on a tree structure of the match tree, the match identifier of the first log being within a range of sub-match values of the target sub-node, and the target sub-node being a sub-node at a bottom layer of the tree structure.

2. The method of claim 1, wherein:
the tree structure of the match tree includes a root node and one or more layers of sub-nodes,
a total range of sub-match values for matching of sub-nodes at a same layer is equal to a range of match values of the root node, and
respective ranges of sub-match values of sub-nodes at the bottom layer of the tree structure of the match tree are set such that a difference between data of respective target logs distributed to the sub-nodes at the bottom layer by matching in a log fragmentation via the match tree is less than a preset difference.

3. The method of claim 1, further comprising:
allocating the first log to a fragment corresponding to the target sub-node.

4. The method of claim 3, wherein the match tree comprises a partial tree structure of a balanced tree that describes the data table, a root node of the match tree is a root node of the balanced tree, and at least one layer of sub-nodes of the match tree is at least one layer of branch nodes of the balanced tree.

5. The method of claim 4, wherein increasing the number of layers of the branch nodes included in the match tree includes increasing the number of layers of the branch nodes of the balanced tree included in the match tree.

6. The method of claim 1, wherein the match identifier of the first log identifies a first data record, and the first data record includes a data record in a data table corresponding to the first log.

7. The method of claim 6, wherein the match identifier of the first log includes a primary key value of the first data record.

8. One or more computer-readable media storing executable instructions that, when executed by one or more processors, cause the one or more processors to perform acts comprising:
receiving a first log sent by a master database server, the first log including a data table identifier, a match identifier, a log identifier, and a data change to a data table corresponding to the first log;
determining a match tree based at least in part on the data table identifier of the first log;
fragmenting the first log based at least in part on the match tree; and
while fragmenting:
concurrently replaying multiple fragments obtained through a log fragmentation, wherein the first log is replayed according to the log identifier of the first log and the data change,
increasing a number of layers of branch nodes included in the match tree if a number of target logs distributed to the fragment exceeds a preset threshold,
matching the match identifier of the first log with the match tree, and
determining a target sub-node that matches the match identifier of the first log based at least in part on a tree structure of the match tree, the match identifier of the first log is within a range of sub-match values of the target sub-node, and the target sub-node being a sub-node at a bottom layer of the tree structure.

9. The one or more computer-readable media of claim 8, wherein:
the tree structure of the match tree includes a root node and one or more layers of sub-nodes,
a total range of sub-match values for matching of sub-nodes at a same layer is equal to a range of match values of the root node, and
respective ranges of sub-match values of sub-nodes at the bottom layer of the tree structure of the match tree are set such that a difference between data of respective target logs distributed to the sub-nodes at the bottom layer by matching in a log fragmentation via the match tree is less than a preset difference.

10. The one or more computer-readable media of claim 8, wherein the acts further comprise:
allocating the first log to a fragment corresponding to the target sub-node.

11. The one or more computer-readable media of claim 10, wherein the match tree comprises a partial tree structure of a balanced tree that describes the data table, a root node of the match tree is a root node of the balanced tree, and at least one layer of sub-nodes of the match tree is at least one layer of branch nodes of the balanced tree.

12. The one or more computer-readable media of claim 11, wherein increasing the number of layers of the branch nodes included in the match tree includes increasing the number of layers of the branch nodes of the balanced tree included in the match tree.

13. The one or more computer-readable media of claim 8, wherein the match identifier of the first log identifies a first data record, and the first data record includes a data record in a data table corresponding to the first log.

14. The one or more computer-readable media of claim 13, wherein the match identifier of the first log includes a primary key value of the first data record.

15. An apparatus comprising:
one or more processors;
memory;
a receiving unit stored in the memory and executable by the one or more processors to receive a first log sent by a master database server, the first log including a data table identifier, a match identifier, a log identifier, and a data change to a data table corresponding to the first log;
a determination unit stored in the memory and executable by the one or more processors to determine a match tree based at least in part on the data table identifier of the first log;

a fragmentation unit stored in the memory and executable by the one or more processors to fragment the first log based at least in part on the match tree, match the match identifier of the first log with the match tree, and determine a target sub-node that matches the match identifier of the first log based at least in part on a tree structure of the match tree, the match identifier of the first log being within a range of sub-match values of the target sub-node, and the target sub-node being a sub-node at a bottom layer of the tree structure, and a replay unit stored in the memory and executable by the one or more processors to concurrently replaying multiple fragments obtained through a log fragmentation while the fragmentation unit fragments the first log, wherein the first log is replayed according to the log identifier of the first log and the data change, wherein, while the fragmentation unit fragments the first log, a number of layers of branch nodes included in the match tree is increased if a number of target logs distributed to the fragment exceeds a preset threshold.

16. The apparatus of claim 15, further comprising a match tree setting unit configured to obtain the match tree according to a target table set, wherein:

the target table set includes at least one data table in a database, a tree structure of the match tree includes a root node and at least one layer of sub-nodes of the root node, a range of match values for matching the root node is determined according to ranges of match identifiers included in multiple target logs, the multiple target logs being data logs corresponding to the at least one data table, and the first log being a target log of the multiple target logs, a total range of sub-match values for matching of sub-nodes at each layer is equal to the range of match values of the root node, respective ranges of sub-match values of sub-nodes at a bottom layer of the tree structure of the match tree are set such that a difference between data of respective target logs distributed to the sub-nodes at the bottom layer by matching during a log fragmentation via the match tree is less than a preset difference, a sub-node at the bottom layer of the tree structure of the match tree corresponding to a fragment.

17. The apparatus of claim 15, wherein the fragmentation unit further allocates the first log to a fragment corresponding to the target sub-node.

18. The apparatus of claim 15, wherein:

the match tree comprises a partial tree structure of a balanced tree that describes the data table, a root node of the match tree is a root node of the balanced tree, and at least one layer of sub-nodes of the match tree is at least one layer of branch nodes of the balanced tree.

19. The apparatus of claim 15, wherein the match identifier of the first log identifies a first data record, and the first data record includes a data record in the data table corresponding to the first log.

20. The apparatus of claim 19, wherein the match identifier of the first log includes a primary key value of the first data record.

* * * * *